(12) United States Patent
Stegman et al.

(10) Patent No.: US 7,944,347 B2
(45) Date of Patent: May 17, 2011

(54) APPARATUS FOR ACCELERATING SENSOR READING UPON START-UP

(75) Inventors: Jeffrey Stegman, Cincinnati, OH (US); Scott Comisar, Plano, TX (US)

(73) Assignee: Doran Manufacturing LLC, Cincinnati, OH (US)

( * ) Notice: Subject to any disclaimer, the term of this patent is extended or adjusted under 35 U.S.C. 154(b) by 359 days.

(21) Appl. No.: 12/268,897

(22) Filed: Nov. 11, 2008

(65) Prior Publication Data

US 2009/0128314 A1  May 21, 2009

Related U.S. Application Data

(60) Provisional application No. 60/987,076, filed on Nov. 11, 2007.

(51) Int. Cl.
*B60C 23/02* (2006.01)
(52) U.S. Cl. ........................... 340/442; 73/146.5
(58) Field of Classification Search .................. 340/442, 340/445, 447; 73/146.4, 146.5, 146.2, 146; 116/34 R; 361/115
See application file for complete search history.

(56) References Cited

U.S. PATENT DOCUMENTS

| | | | |
|---|---|---|---|
| 6,914,523 B2 * | 7/2005 | Munch et al. | 340/447 |
| 7,088,016 B2 * | 8/2006 | Hattori | 307/139 |
| 7,288,852 B2 * | 10/2007 | Hattori | 307/9.1 |
| 2009/0102634 A1 * | 4/2009 | Okada et al. | 340/442 |

* cited by examiner

*Primary Examiner* — Toan N Pham
(74) *Attorney, Agent, or Firm* — Wm. Cates Rambo

(57) ABSTRACT

Apparatus for monitoring one or more motor vehicle tire conditions includes a receiver for intercepting signals from sensors mounted on the tires, a processor for identifying, converting, evaluating and storing said sensor signals, a keypad for selecting sensor data, an alarm for indicating an undesirable tire condition, and a display for providing sensor data. An unswitched circuit is connected to the vehicle battery and to the receiver and the processor in the monitoring apparatus. A switched circuit is connected via an ignition switch to the battery and to the monitoring apparatus as a whole. Sensor information obtained by the processor while the ignition switch is off is available to the user as soon as the ignition switch is turned on.

8 Claims, 2 Drawing Sheets

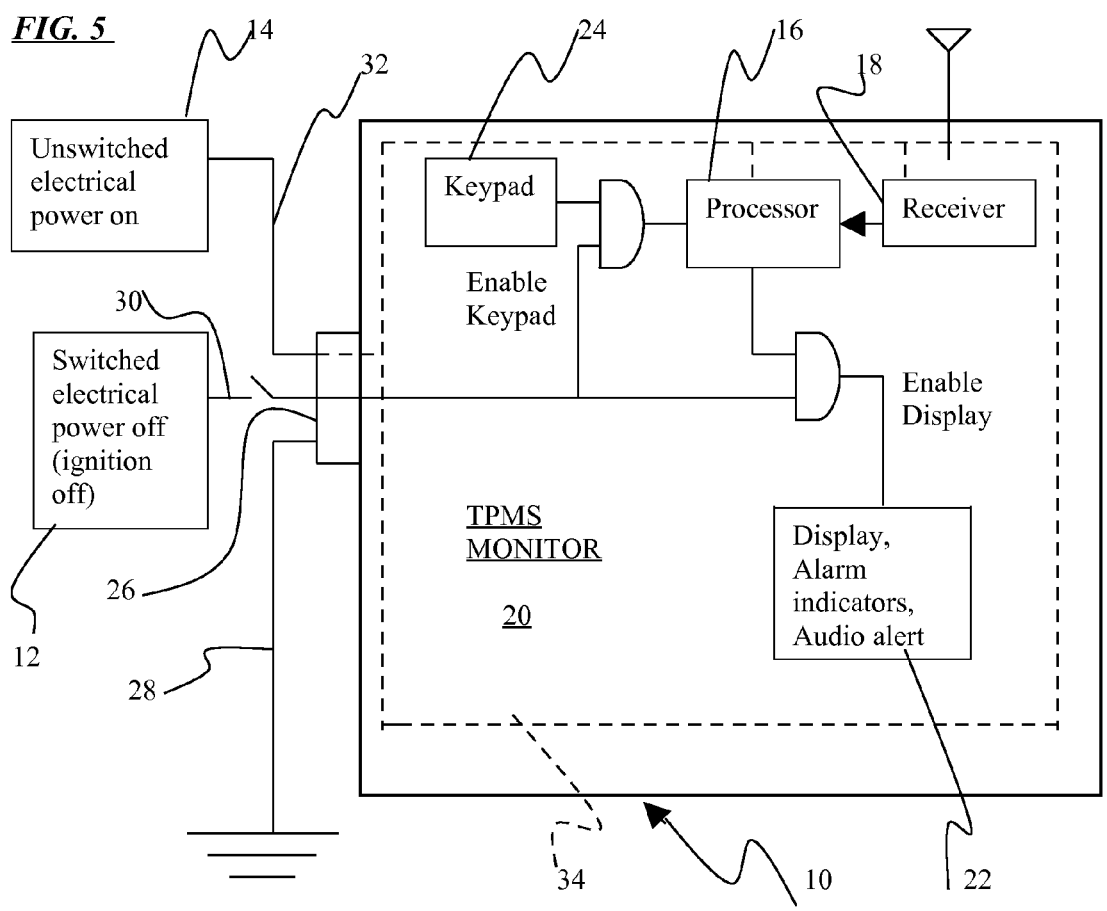

APPARATUS FOR ACCELERATING SENSOR READING UPON START-UP

RELATED APPLICATION

The present application is related to U.S. Provisional Application No. 60/987,076 filed Nov. 11, 2007 in the names of the above-identified inventors.

TECHNICAL FIELD

The present invention relates to electronic apparatus for sensing and informing the operator of one or more conditions, such as tire pressure, on a motor vehicle, and more particularly to apparatus for informing the operator of the sensed condition promptly upon start-up of the vehicle.

As illustrated in FIGS. 1 and 2, a shortcoming of conventional tire pressure monitoring systems (TPMS) stems from the fact that they are usually turned off when the vehicle is turned off. Typically, the occupant or occupants of trucks and recreation vehicles do not want to be disturbed by a tire pressure alarm when they are trying to rest or relax within the vehicle after a long drive. Consequently, most TPMS are tied into a switched circuit, which turns the TPMS completely off when the ignition is turned off. The difficulty arises when it is time to get back on the road. When the ignition is turned on, the conventional TPMS has to wait for each sensor to check in before it can display the tire conditions. The sensors report in at approximately six minute intervals, so in the best case, there is at least a six minute delay. However, when there is a missing, inoperative or blocked sensor, it typically takes 3 missed transmissions for the processor to make that determination. In this situation, if the operator drives off before the 18 minutes delay, the operator must chose to ignore the problem or make an additional stop to correct it.

SUMMARY OF THE INVENTION

The present invention is an improvement In an apparatus for monitoring one or more motor vehicle tire conditions. The monitoring apparatus has a receiver for intercepting signals from sensors mounted on the tires, a processor for identifying, converting, evaluating and storing said sensor signals, a keypad for selecting sensor data, an alarm for indicating an undesirable tire condition, and a display for providing sensor data. The improvement basically comprises an unswitched circuit connected to a voltage source and to the receiver and the processor in the monitoring apparatus and a switched circuit connected to the voltage source and to the monitoring apparatus as a whole.

BRIEF DESCRIPTION OF DRAWING

FIG. 5 is a rudimentary circuit diagram of the embodiment of FIGS. 3 and 4.

DETAILED DESCRIPTION OF EXEMPLARY EMBODIMENT

Figure 1:
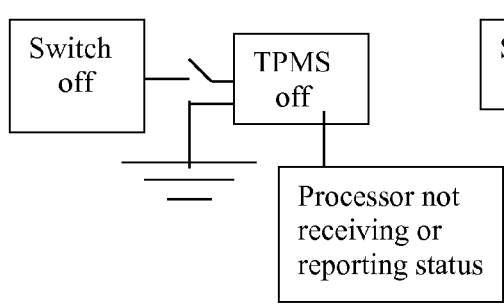
FIG. 1 is a block diagram of a conventional TPMS with a switched circuit in an off/open condition.
Figure 2:
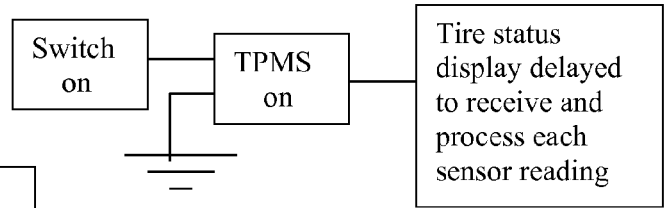
FIG. 2 is a block diagram of the conventional TPMS of FIG. 1, with the switched circuit in an on/closed condition.
Figure 3:
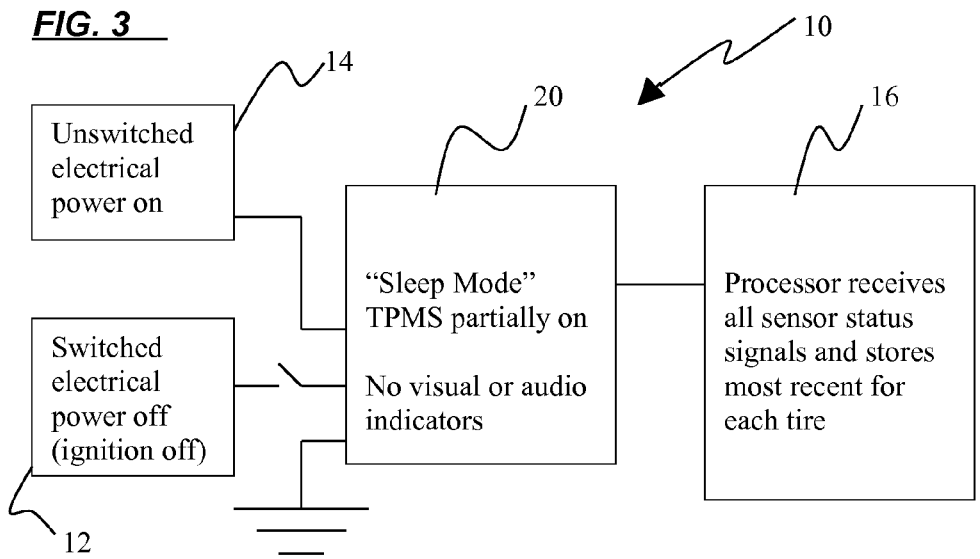
FIG. 3 is a block diagram of an illustrative embodiment of the present invention, wherein an unswitched electrical current is constantly provided to the device and a switched current source is open or off.
Figure 4:
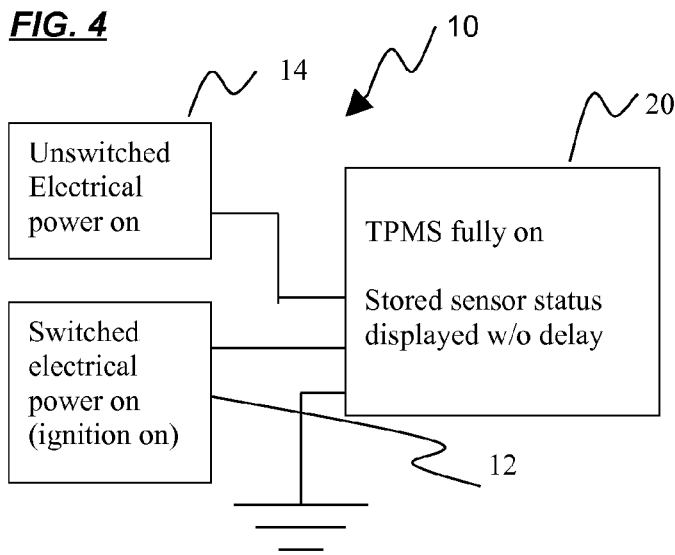
FIG. 4 is a block diagram of the embodiment of FIG. 3, wherein both the unswitched and the switched electrical current are provided to the device.

As illustrated in FIGS. 3-5, the present TPMS, generally designated 10, automatically enters a "Sleep Mode" condition when a switched electrical source 12 connected to the vehicle's ignition is turned off. In the Sleep Mode condition, unswitched electrical power 14, which is provided by a battery subcircuit (not shown) and is conventionally modified for a microcircuit, continues to reach the processor 16 and the receiver 18. In a conventional manner, remote sensors (not shown) transmit tire pressure or other readings at selected intervals independently of the on/off status of the monitor 20 housing the processor 16, receiver 18, display 22, keypad 24, and other electrical elements of the present TPMS 10. The receiver 18 picks up these sensor readings and feeds them to the processor 16. The processor 16 identifies the signals, determines if they are in range and temporarily stores the most recent readings. Since the keypad 24, display 22 and other electrical elements in the monitor 20 are not on during the Sleep Mode, there are no visual or audible indications of the information the processor is gathering. However, when the switched (ignition) electrical power 12 is turned on, the operator may input selections via the keypad 24 and the stored sensor data will be displayed with little or no delay.

As illustrated in FIG. 5, the present TPMS 10 may include a three wire harness 26 wherein a first wire 28 is grounded, a second wire 30 is connected to the ignition subcircuit 12 and a third wire 32 is connected to a substantially constant source of electrical power, such as the battery subcircuit 14. When the ignition subcircuit 12 is off, the processor 16 and the receiver 18 may be energized by the battery subcircuit 14 via the third wire 32 and a microprocessor subcircuit 34 internal to the monitor 20. In this Sleep Mode, signals from the remote sensors (not shown) reach the receiver 18 which converts and passes them along in conventional fashion to the processor 16. The processor may be programmed to store the results without triggering an alarm condition in the display unit 22 and to enter the Sleep Mode when power is removed from the switched circuit 12. When the operator turns the ignition key on, the display unit 22, keypad 24 and other components of the monitor become operative, and the processor may be programmed to feed the most recently stored sensor data to the display 22 and otherwise alert the operator in substantially instantaneous fashion concerning the pressure in the tires or other sensed parameters. In this manner, there is substantially no delay in informing the operator of the sensed condition upon start-up, so remedial measures, if necessary, can be taken before the vehicle moves onto the highway.

The invention claimed is:

1. In an apparatus for monitoring one or more motor vehicle tire conditions, said apparatus having a receiver for intercepting signals from sensors mounted on the tires, a processor for identifying, converting, evaluating and storing said sensor signals, a keypad for selecting sensor data, an alarm for indicating an undesirable tire condition, and a display for providing sensor data, that improvement which comprises:
   a. an unswitched circuit connected to a voltage source and to the receiver and the processor in the monitoring apparatus; and
   b. a switched circuit connected to the voltage source and to the monitoring apparatus as a whole.

2. The apparatus according to claim 1, wherein an ignition switch in the motor vehicle opens and closes the switched circuit.

3. The apparatus according to claim 2, wherein the unswitched circuit is operative when the ignition switch is turned off.

4. The apparatus according to claim 3, wherein a battery in the motor vehicle is the voltage source.

5. The apparatus according to claim 4, wherein a three conductor harness defines a portion of the unswitched and switched circuits, said three conductor harness having a grounded first conductor, a second conductor connected to the ignition switch, and a third conductor connected to the battery.

6. Apparatus according to claim 3, wherein the keypad, the alarm and the display are inoperative and the receiver and the processor are operative when the ignition switch is turned off.

7. The apparatus according to claim 6, wherein the processor identifies, converts, evaluates and stores sensor signals when the ignition switch is turned off.

8. Then apparatus according to claim 7, wherein sensor data generated by the processor when the ignition switch is turned off is available to the user as soon as the ignition switch is turned on.

* * * * *